(No Model.) 3 Sheets—Sheet 1.

J. F. WIEST.
SOLAR CAMERA.

No. 474,708. Patented May 10, 1892.

Witnesses:

Inventor:
John F. Wiest
By Dudley & Michener
his Attorneys.

(No Model.) 3 Sheets—Sheet 2.

J. F. WIEST.
SOLAR CAMERA.

No. 474,708. Patented May 10, 1892.

Witnesses:

Inventor:
John F. Wiest
By Dudley & Michener
his Attorneys.

(No Model.) 3 Sheets—Sheet 3.

J. F. WIEST.
SOLAR CAMERA.

No. 474,708. Patented May 10, 1892.

Witnesses:
Wiley Norton
W. R. Brundage

Inventor:
John F. Wiest
By Dudley & Michener
his Attorneys

UNITED STATES PATENT OFFICE.

JOHN F. WIEST, OF HUNTINGTON, INDIANA.

SOLAR CAMERA.

SPECIFICATION forming part of Letters Patent No. 474,708, dated May 10, 1892.

Application filed April 18, 1891. Serial No. 389,498. (No model.)

*To all whom it may concern:*

Be it known that I, JOHN F. WIEST, a citizen of the United States, residing at Huntington, in the county of Huntington and State of Indiana, have invented certain new and useful Improvements in Solar Cameras; and I do hereby declare the following to be a full, clear, and exact description of the invention, such as will enable others skilled in the art to which it appertains to make and use the same.

My present invention relates to solar cameras, and has for its object to furnish a cheap and efficient apparatus in a portable form.

My invention consists in the construction and arrangement of the several parts forming my improved solar camera, all of which will be presently fully and clearly described, reference being had to the accompanying drawings, forming a part of this specification, and in which—

Figure 1:
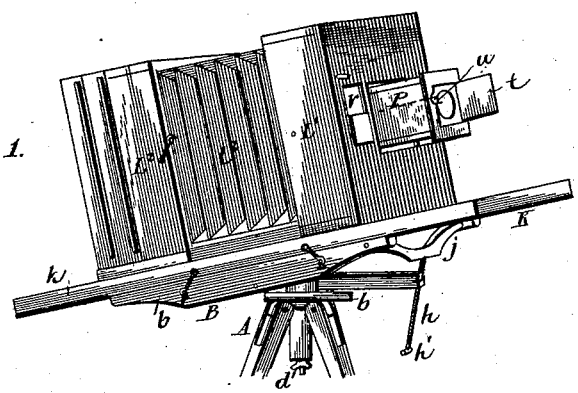
Figure 2:
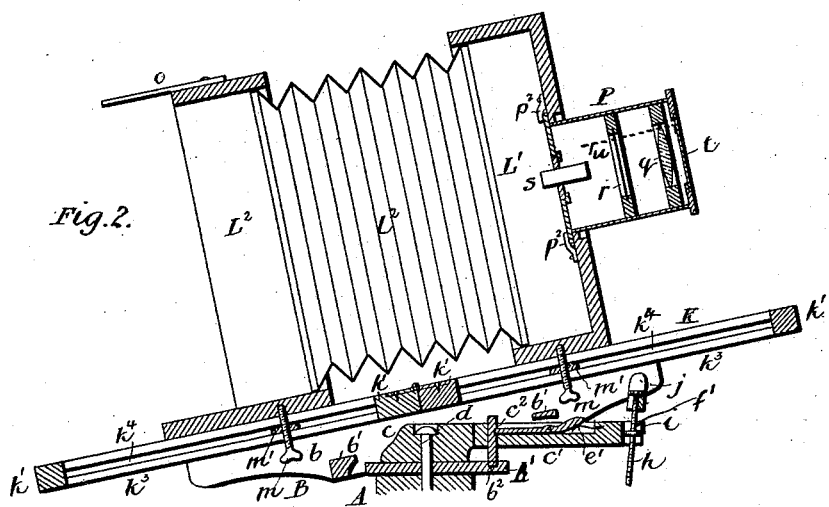
Figure 3:
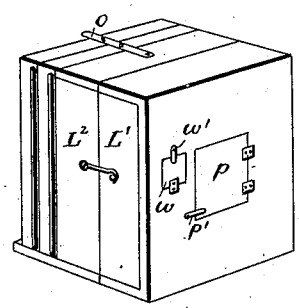
Figure 4:
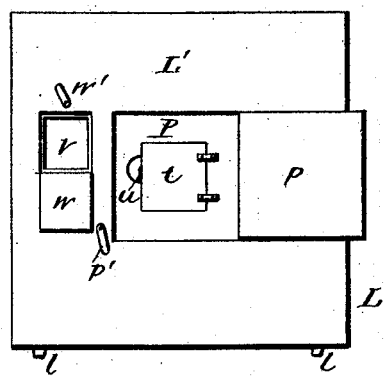
Figure 5:
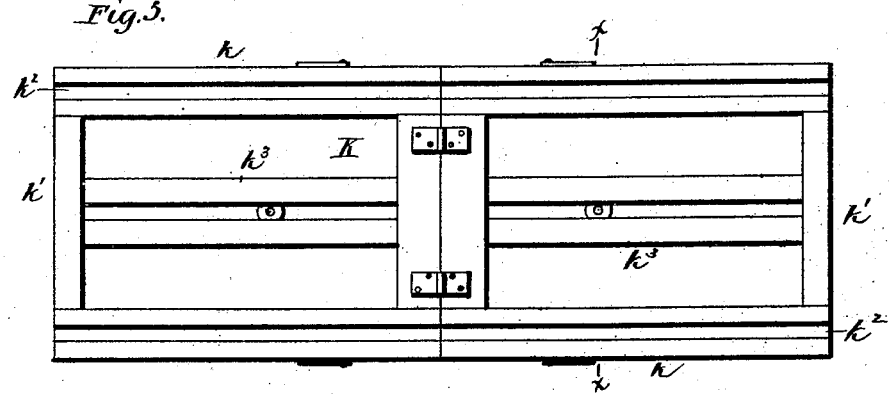
Figure 6:
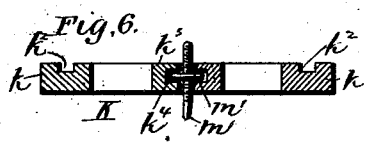
Figure 7:
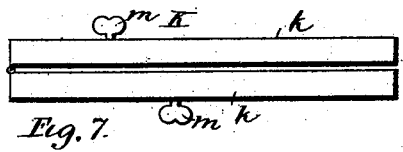
Figure 8:
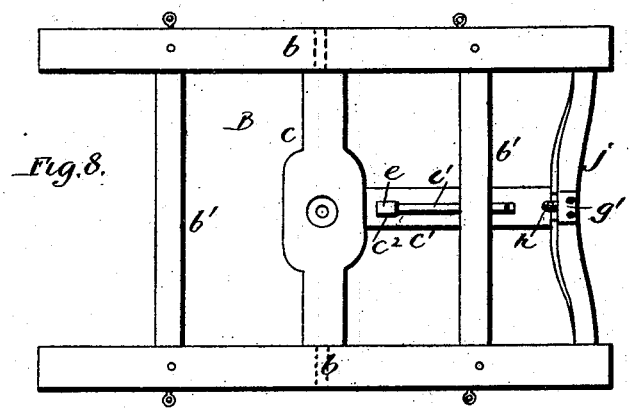
Figure 9:
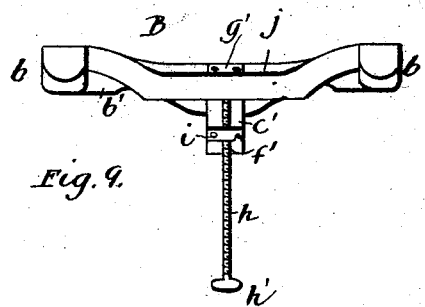
Figure 10:
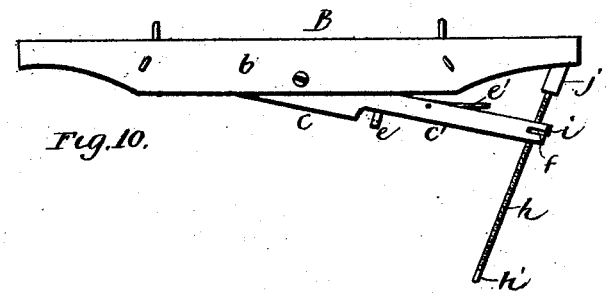
Figure 11:
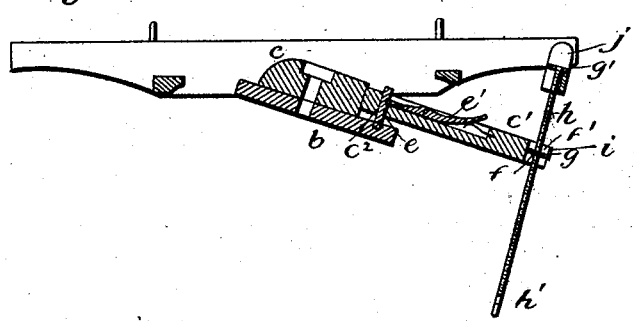
Figure 12:
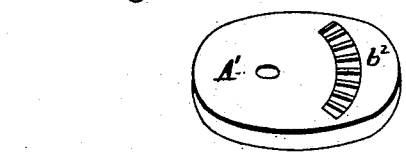

Figure 1 is a perspective view of the camera mounted in position for use; Fig. 2, a central longitudinal section of the same; Fig. 3, a perspective view of the box in its closed position; Fig. 4, a front elevation of the box; Fig. 5, a plan view of the guide-frame; Fig. 6, a section through line $x\,x$, Fig. 5; Fig. 7, a view of the frame folded; Fig. 8, a plan view of the main frame; Fig. 9, a front view of the same; Fig. 10, a side elevation thereof; Fig. 11, a central longitudinal section thereof and showing the bearing-plate on which the main frame rests, and Fig. 12 is a perspective view of such bearing-plate.

Similar letters of reference in all the figures of the drawings indicate corresponding parts.

Referring to the several figures of the drawings, A represents the upper portion of a tripod, which has mounted thereon a bearing-plate $A'$, on which the camera and frames rest and are permitted to revolve.

B denotes the main frame, which consists of the side pieces $b\,b$, connected by cross-pieces $b'\,b'$. Midway of the length of the side pieces $b\,b$ is pivotally secured a cross-piece $c$, the enlarged central portion of which rests on and is supported by the bearing-plate $A'$, a bolt $d$, passing through this cross-piece and through the bearing-plate and head of the tripod, serving to connect these parts together, but permitting the turning of the main frame when the thumb-screw $d'$ on the lower end of the bolt is loosened. Extending forward of the cross-piece $c$ and rigidly connected thereto is an arm $c'$, which is formed with a slot $c^2$, in which a pawl $e$ is adapted to move in vertical lines and be operated by a spring-depressed lever $e'$. The lower end of the pawl is beveled and is adapted to engage the series of ratchet-teeth $b^2$, formed in the bearing-plate $A'$. By reason of this construction the main frame may be turned horizontally at any desired angle, the pawl-and-ratchet mechanism temporarily holding the frame in the desired position, and the parts are then rigidly secured by means of the thumb-screw $d'$ on the lower end of the bolt. At the outer end of the arm $c'$ is a recess $f'$, which receives and holds a washer $g$, through the center of which and through the recess $f'$ a screw-threaded rod $h$ passes. This washer is temporarily held in place by means of the button $i$. The upper end of the rod $h$ is secured but permitted to turn in a plate $g'$, which is fastened to a cross-piece $j$, pivotally secured to the forward part of the main frame. On the lower end of the rod $h$ is a thumb-piece $h'$, the turning of which changes the angle of elevation to any degree, according to the position required.

Above the main frame and supported thereby is a second frame K, which is made in two sections hinged together, as shown, to permit of its being folded. The sections of this frame are composed of the side pieces $k\,k$ and the cross-pieces $k'\,k'$, and this frame is secured to the main frame by means of hooks and eyes, as shown. The side pieces $k\,k$ are provided with grooves $k^2\,k^2$, which receive the ribs $l\,l$ on the box L, presently to be described. Pieces $k^3\,k^3$ are arranged centrally of the frame and are provided with grooves $k^4\,k^4$, which receive the washers $m'$ on the binding-screws $m$, said screws being connected to the bottom of the box and performing a function presently to be explained.

The box L is constructed of two parts or sections $L'\,L^2$, connected by a bellows $l^2$, and, as before stated, is supported by the frame K, the ribs on the bottom of the box entering the grooves $k^2\,k^2$, thus preserving the proper alignment of the parts when the box is extended. The upper ends of the binding-screws $m$ enter screw-threaded sockets made therefor in the bottom of the box and serve the purpose of holding the portions of the box at any position along the length of the frame and any desired distance apart. To the portion $L^2$ of the box is secured the plate-holder, and for convenience of transportation any number of holders may be carried at the rear of the box. In the present instance I have shown two holders, which are held at the bottom by pins and at the top by the spring-clip $o$. The forward portion $L'$ of the box contains the tube P, which contains the condensing-lens $q$, the negative $r$, the object-glass $s$, and the shutter $t$. The tube is adapted to be moved inward or outward, and is held in the first instance by means of the cover $p$ and button $p'$ and in the extended position by the buttons $p^2 p^2$.

$u$ is a rod for adjusting the negative, and is operated by a small crank at the outer end thereof, as shown. A small opening $v$ is made at one side of the section $L'$ to permit observations being made in the interior of the box. This window is provided with a shutter $w$ and a button $w'$.

By my invention I am enabled to manufacture at a reduced cost an efficient camera for solar purposes, and one that is rendered portable by reason of the small compass the different parts may be folded into. I am also enabled by my invention to construct a solar camera with a bellows, as in ordinary cameras, thereby dispensing with the most of the complex mechanism heretofore employed in cameras of this character.

Having now particularly described and ascertained the nature of my invention and the manner in which the same is to be performed, I declare that what I claim is—

1. In a solar camera, the combination, with a tripod or other suitable support, of a main frame pivotally secured thereon and having means for adjusting the angle of elevation, a second frame supported by the main frame and having grooves therein, a camera-box formed in two sections connected by a bellows and having ribs for the said grooves, and set-screws secured to the under portions of the box-sections and adapted to move therewith, whereby both boxes are permitted to be moved and secured at any desired position along the length of the frame.

2. In a solar camera, the combination, with a suitable support therefor, of a main frame for supporting the camera, having a cross-piece pivoted thereto and adapted to be pivotally connected to the support and be horizontally rotated thereon, an arm extending outward from said cross-piece provided with means for temporarily securing the frame in its horizontal adjustment, and a set-screw connecting the end of said arm with the end of the frame, whereby the adjustment of the angle of elevation is permitted, substantially as described.

3. In a camera, the combination, with a tripod and a bearing-plate thereon formed with ratchet-teeth, as described, of a frame for supporting the camera, having a cross-piece secured centrally to the bearing-plate and having an arm extending outward therefrom provided with a spring-pawl adapted to engage the teeth in the bearing-plate, and a screw-threaded rod connecting the outer end of the arm with the forward part of the frame, all as and for the purposes set forth.

In testimony whereof I affix my signature in presence of two witnesses.

JOHN F. WIEST.

Witnesses:
HENRY B. SAYLER,
SAMUEL M. SAYLER.